(12) United States Patent
Simony

(10) Patent No.: US 7,126,636 B2
(45) Date of Patent: Oct. 24, 2006

(54) LOW-NOISE CMOS ACTIVE PIXEL

(76) Inventor: Laurent Simony, 11, Allee due Parc Pompidou, Grenoble, 38100 (FR)

( * ) Notice: Subject to any disclaimer, the term of this patent is extended or adjusted under 35 U.S.C. 154(b) by 714 days.

(21) Appl. No.: 10/437,741

(22) Filed: May 14, 2003

(65) Prior Publication Data
US 2003/0214596 A1 Nov. 20, 2003

(30) Foreign Application Priority Data
May 17, 2002 (FR) .................... 02 06068

(51) Int. Cl.
*H04N 3/14* (2006.01)
(52) U.S. Cl. ...................... 348/301; 348/308
(58) Field of Classification Search ............... 348/294, 348/300, 302, 301, 308; 250/208.1; 257/292
See application file for complete search history.

(56) References Cited

U.S. PATENT DOCUMENTS

| | | | |
|---|---|---|---|
| 5,705,807 A * | 1/1998 | Throngnumchai et al. .. | 250/214 P |
| 5,777,675 A * | 7/1998 | Miida et al. ............. | 348/221.1 |
| 6,498,332 B1 * | 12/2002 | Funakoshi ............... | 348/308 |
| 6,664,530 B1 * | 12/2003 | Simony .................... | 250/208.1 |
| 2002/0066848 A1 * | 6/2002 | Fowler .................... | 250/208.1 |

FOREIGN PATENT DOCUMENTS

WO WO01/22727 A1 3/2001

OTHER PUBLICATIONS

Preliminary Search Report for French Patent Appl. No. 02 06068 dated Jan. 2, 2003.

\* cited by examiner

*Primary Examiner*—Lin Ye
*Assistant Examiner*—Jason Whipkey
(74) *Attorney, Agent, or Firm*—Lisa K. Jorgenson; Jon A. Gibbons; Fleit, Kain, Gibbons, Gutman, Bongini & Bianco P.L.

(57) ABSTRACT

A low-noise CMOS active pixel for image sensors comprises a photosensitive element (PD), a feedback capacitive element (CF) with a capacitance $C_F$, and four transistors, namely a first transistor (M1), two reset transistors (M3, M4) and one pixel selection transistor (M2). These components are laid out and controlled in such a way that the first transistor (M1) is mounted as an amplifier during the pixel reset phase and as a follower during the read phase. The reset transistors (M3, M4) are parallel-connected so that one of them (M4) compensates for the negative effects of the other transistor (M3) on the node common to the two transistors.

20 Claims, 6 Drawing Sheets

LOW-NOISE CMOS ACTIVE PIXEL

CROSS REFERENCE TO RELATED APPLICATIONS

This application is based upon and claims priority from prior French Patent Application No. 02 06068, filed May 17, 2002, the disclosure of which is hereby incorporated by reference in its entirety.

BACKGROUND OF THE INVENTION

1. Field of the Invention

The present invention generally relates to the field of image sensors with CMOS active pixels and more particularly to a low-noise CMOS active pixel.

2. Description of Related Art

At present, the main limitation of image sensors with CMOS active pixels lies in the presence of a reset noise in the electrical signals produced by the pixels of the sensor. This reset noise is troublesome because it is preponderant over the other noises in the signal-acquisition analog chain.

A classic CMOS active pixel essentially comprises a photosensitive element, such as a photodiode, associated with three transistors, a selection transistor to select the pixel, a transistor to reset the electrical charge of the photosensitive element and a read transistor to deliver a signal representing the electrical charge of the photodiode before and after the resetting of the pixel. The structure of a CMOS active pixel of this kind is shown in FIG. 1. The photosensitive element, referenced PD, is represented therein by its capacitance $C_P$. A reset transistor MR is connected between a power supply terminal VDD and the photosensitive element. This transistor is connected to the photosensitive element at a point known as a photosensitive node. This photosensitive node is furthermore connected to a gate of the read transistor MD. The drain of the transistor MD is connected to the power supply terminal VDD and its source is connected to the drain of a selection transistor MS. Finally, the drain of the transistor MS is connected to an output terminal S of the pixel. To select this pixel, a signal SEL is applied to the gate of the transistor MS.

A CMOS active pixel of this kind works as follows: during a reset phase (when the RESET signal is active), the potential of the photosensitive element is reset at a fixed value V0. Then, under the effect of a light signal, the electrical charge of the photosensitive element is modified, and the voltage at its terminals then goes from V0 to V0-Vsignal, Vsignal representing the number of incident photons received by the pixel. A method known as the CDS (Correlated Double Sampling) method is then used to read the value Vsignal. In this method, the signal is read at the output of the pixel before and after the resetting of the pixel and then the difference between the two signals is computed to deduce Vsignal therefrom.

This pixel structure has four drawbacks. A first drawback is that the reset phase gives rise to a reset noise in the photosensitive element. This noise is especially high as the capacitance of the photodiode is low. The root-mean-square value of this noise is given by the following formula:

$$B = \sqrt{\frac{kT}{C_P}}$$

where k is the Boatman constant, T is the absolute temperature and $C_P$ is the capacitance of the photodiode. With a capacitance $C_P$ of 3 femtofarads, the root-mean-square value of the noise is 1.2 mV at a temperature of 300 Kelvin.

A second drawback is the presence of a power supply noise. Indeed, there is a direct coupling between the voltage power supply source VDD and the photosensitive node by means of the drain-gate capacitance of the read transistor. A power supply noise then gets added to the reset noise in the photodiode.

Furthermore, the use of a MOS transistor as a switch to reset the pixel produces an injection of electrical charges into the photodiode: then, after the MOS transistor has passed into the off state, a part of the electrical charges forming the channel of this transistor is located in the capacitance of the photodiode. The voltage variation that results therefrom is especially high as the capacitance of the photodiode is low. This phenomenon reduces the voltage excursion of the output signal by a fraction that can be relatively big.

Finally, a problem of lag also appears when the reset phase does not succeed in completely erasing the information acquired in the photodiode during the previous reading phase. On a screen, this lag takes the form of a persistence of the image: the image read then contains a residue of the previous image. This problem appears when a small-band-width reset technique is used.

To overcome all or a part of these problems, a novel CMOS active pixel structure has been developed. This structure is disclosed in the French patent application filed under number 01/07349, on May 28, 2001 on behalf of the present applicant and the content of which are hereby incorporated hereinto by reference in its entirety. This novel CMOS active pixel structure is illustrated by FIGS. 2 and 3.

With reference to FIG. 2, the CMOS active pixel, referenced P, comprises a photodiode PD with a capacitance $C_P$, an amplifier AMP1 that is active during the reset phase (the signal READ being inactive), a follower amplifier AMP2 active during the read phase (with the signal READ active), two switches IT1 and IT2 series-connected between the output and the inverter input of the amplifier AMP1, and a capacitive element CF having a capacitance CF, parallel-connected with the switch IT1. The photodiode PD is connected between a photosensitive node N and the ground. The non-inverter input of the amplifier AMP1 is connected to an output terminal S of the pixel which receives a reference voltage during the pixel reset phase. The follower amplifier AMP2 which is active during the READ phase is furthermore connected between the photosensitive node and the output terminal S of the pixel.

A more detailed structure of this CMOS active pixel is shown in FIG. 3. A transistor M1 and a row selection transistor M2 are used to form the amplifier AMP1 during the reset phase. These transistors also form the follower amplifier AMP2 during the read phase. Transistors M3 and M4 are also used to form the switches IT1 and IT2.

These components are connected together as follows. The transistor M1 has its gate connected to the photosensitive node N and its source connected to the output terminal S of the pixel. The output terminal S delivers a signal representing the electrical charge of the photodiode during the pixel-reading phase. The selection transistor M2 is cascade-mounted with the transistor M1, namely its source is connected to the drain of the transistor M1. Its drain is connected to a node B common to all the pixels of the column to which the pixel considered is connected and its gate receives a selection signal SEL to select the pixel. The transistor M3, forming the switch IT1, is connected between the photosensitive node N and a point A of the pixel. This transistor is controlled by a reset signal RS1 which is active during a first period $\phi_1$ of the pixel reset phase. The pixel reset phase is indeed formed by three consecutive time periods $\phi_1$, $\phi_2$ and $\phi_3$.

The transistor M4 is connected between the node B and the node A. This transistor is controlled by a reset signal RS2 which is active during the time periods $\phi_1$ and $\phi_2$ of the reset phase. The capacitive element CF is parallel-connected with the transistor M3 between the node A and the node N. Finally, the sum of the capacitive contributions of each pixel of the column of the pixel considered between its respective point B and the ground is shown in the drawing by a capacitor C, connected between the node B and the ground.

The image sensor containing the pixel has means provided to bias and power the pixel during the different phases of operation of the pixel. These means are advantageously common to all the pixels of one and the same column in the image sensor, and even to all the pixels of the image sensor as the case may be. A voltage source VDD and current source SC1 are therefore provided to power the node B of the pixel respectively during the read phase and the reset phase of the pixel. Provision is also made for a second current source SC2 and a voltage source SV having negligible current to impose, respectively, a current during the read phase and a reference voltage VREF during the reset phase on the output terminal S of the pixel.

The working of this CMOS active pixel is illustrated by the timing diagrams of the control signals SEL, RS1, RS2 and READ of FIG. 4. The reading of the information contained in the photodiode after modification of its electrical charge under the effect of a light signal requires a first read phase to acquire a signal representing the illumination of the pixel by the light signal, a phase for resetting the electrical charge of the pixel and a second read phase to acquire a signal representing the initial electrical charge of the pixel. The difference between these two signals gives a signal representing the variation of the electrical charge due to the incident photons of the light signal.

During the first and second phases for reading the pixel, the control signal READ and the selection signal SEL are active while the signals RS1 and RS2 are inactive. In the present case (pertaining to the use of the N channel MOS transistors) a signal is said to be active if it is has a high voltage level and it is said to be inactive if it has a low voltage level.

During the first reading phase, the node B is powered by the power supply voltage VDD and a current is imposed by the current source SC2 on the output terminal S of the pixel. The transistors M3 and M4 are off. The transistor M1, which is then mounted as a follower, is powered through the transistor M2. A voltage signal representing the electrical charge of the photodiode is then available at the output terminal S of the pixel.

Then, during the three periods of the reset phase, $\phi_1$, $\phi_2$ and $\phi_3$, the signal READ is inactive.

During the period $\phi_1$ known as the erasure or "hard reset" period, the control signals SEL, RS1 and RS2 are active. The transistors M2, M3 and M4 are therefore conductive. The transistor M1 is mounted as an amplifier and its drain is looped to its gate through the transistor M2.

The pixel is powered by the current coming from the current source SC1 and the reference voltage VREF is imposed on the output terminal S of the pixel. The current given by the current source SC1 goes through the transistors M1 and M2 and is absorbed by the voltage source SV. A potential VREF+$V_{GS}$(M1) is imposed on the photosensitive node N, with $V_{GS}$(M1) representing the gate-source voltage of the transistor M1. This period $\phi_1$ is used for erasing the information initially contained in the pixel in imposing a fixed voltage at the terminals of the photodiode.

During the period $\phi_2$, known as the relaxation period, the control signal RS2 is inactive. The transistor M3 is then off. The noise voltage $$\sqrt{\frac{kT}{C_F}}$$

is sampled on the capacitive element CF. The transistor M1 is in a feedback loop with the capacitive divider formed by the capacitive element CF and the capacitance of the photodiode PD. The transistor M1 then works as an amplifier (amplifier AMP1). Since the transistors M1 and M2 are cascade-connected, a high static gain is obtained for the transistor M1. The gain of the loop formed by the transistors M1 and M2 and the capacitive divider is high despite the capacitive divider. The phase $\phi_2$ must be maintained until the amplifier AMP1 reaches a state of equilibrium.

During the period $\phi_3$, the control signal RS2 is inactive. The transistor M4 is therefore off. This passage to a low level must be done in a very short time as compared with the time constant of the amplifier AMP1.

This CMOS active pixel structure gives satisfactory results in terms of reset noise, power supply noise, injection of electrical charges into the photodiode and lag as explained very clearly in the French patent application No. 01/07349 cited here above.

However, the gate-drain coupling capacitance of the transistor M3 produces a positive voltage variation at the node B (corresponding to the output of the amplifier AMP1) during the period $\phi_2$ of the reset phase. This variation is acceptable so long as the amplifier AMP1 is not saturated and does not clip the signal.

Depending on the etching technology used, this coupling capacitance may be very high. In a borderline case, there is then a very high voltage at the output of the amplifier. This very high voltage is clipped at the value of the power supply voltage VDD minus an unwanted voltage. The progress of the potential at the node B in this case is shown in FIG. 4. Since the output of the amplifier is clipped, it no longer amplifies linearly and the desired effect, i.e. chiefly the correction of the reset noise, is no longer attained.

This coupling actually takes place negatively, during the trailing edge of the control signal RS1. Two phenomena then take place:
    the potential at the photosensitive node N drops instantaneously; and
    a part of the electrical charges constituting the channel of the transistor M3 is injected into the node N, thus contributing to further lowering the potential of the node N.

The drop in potential at the node N controlling the gate of the transistor M1 causes the potential at the node B to rise. The lower the capacitance $C_F$, the greater is this rise in the potential at the output of the amplifier. This corresponds to the conditions of making the pixel.

Accordingly, a need exists to overcome the problems of the coupling capacitance of the transistor M3 and to provide an improved CMOS active pixel that is insensitive to this problem.

SUMMARY OF THE INVENTION

The present invention compensates for the effects of the trailing edge of the control signal RS1 of the transistor M3 by applying a leading edge with the same amplitude on another transistor having the same dimensions in the pixel.

Since it is not desirable to add another transistor to the pixel to implement this compensation, it is planned, according to the present invention, to modify the structure and the operation of the pixel described here above so that the compensation is achieved by the transistor M4 and the control signal RS2.

According to the invention, therefore, a CMOS active pixel structure is proposed in which the MOS transistors M3 and M4 are arranged in a parallel rather than serial type of configuration.

The present invention provides a CMOS active pixel for an image sensor comprising a photosensitive element, such as a photodiode, whose electrical charge is reset during the reset phase and read during a read phase, said photosensitive element being connected between a photosensitive node and the ground, wherein the CMOS active pixel furthermore comprises:

a first amplifier that is active during said reset phase and has its inverter and non-inverter inputs respectively connected to the photosensitive node and to a reference voltage source, a first switch connected between the inverter input and the output of said first amplifier, controlled by a first control signal that is active during a first period of the reset phase and inactive during second and third periods of the reset phase and during the read phase, a capacitive element connected between the output of said first amplifier and an intermediate node of the pixel, a second switch connected between the photosensitive node and the intermediate node of the pixel, controlled by a second control signal that is active during the start of the first period of the reset phase and during the totality of the second period of the reset phase and inactive during the rest of the reset phase and during the read phase, and a second amplifier mounted as a follower, active during the read phase, having its input connected to the photosensitive node and its output delivering a signal representing the electric charge of said photosensitive element during said read phase.

The first and second amplifiers consist of a first transistor whose gate is connected to the photosensitive node and whose source is connected to said reference voltage source during said reset phase and to a first current source during said read phase, and a selection transistor controlled by a selection signal active during said reset and read phases of said pixel, having its source connected to the drain of the first transistor and its drain connected to a second current source during said reset phase and to a power voltage source during said read phase, the source of said first transistor delivering said signal representing the electrical charge of said photosensitive element during said read phase.

The present invention also provides a method for resetting a CMOS active pixel comprising at least one photosensitive element with a capacitance $C_P$ having a photosensitive node, an amplifier having an inverter input connected to said photosensitive node, a non-inverter input and an output, a first switch initially in an open state connected between the inverter input and the output of said amplifier, a capacitive element with a capacitance $C_F$ connected between the output of said amplifier and an intermediate node of the pixel, and a second switch initially in an open state connected between the photosensitive node and the intermediate node, wherein said method comprises the following steps:

applying a reference voltage, during a first period, to the non-inverter input of said amplifier, connecting the output of said amplifier to its non-inverter input by closing said first switch during said first period, and briefly applying said reference voltage to the two terminals of said capacitive element by momentarily closing said second switch at the beginning of said first period to reset the charge of this switch, during a second period known as the relaxation period, setting up a feedback loop between the output of said amplifier and its inverter input by means of said feedback capacitive element by closing said second switch until a state of equilibrium is reached, said first switch being open; and opening said second switch in a third period.

When the second period (at the opening of the first switch) begins, there is a positive variation of the voltage at the output of the amplifier. The closure of the second switch is designed to compensate for this positive variation. This closure of the switch is done before the amplifier reaches saturation and after the first switch has reached a completely open state. This is why the command to close the second switch preferably does not take place immediately after the command to open the first switch but a few nanoseconds later.

Furthermore, at the end of the relaxation period, the transistor forming the second switch is put into weak inversion just before it is turned off, to further reduce the resetting noise produced by this second switch.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be apparent from the following detailed description taken in conjunction with the accompanying drawings.

DETAILED DESCRIPTION OF AN EMBODIMENT

Figure 1:
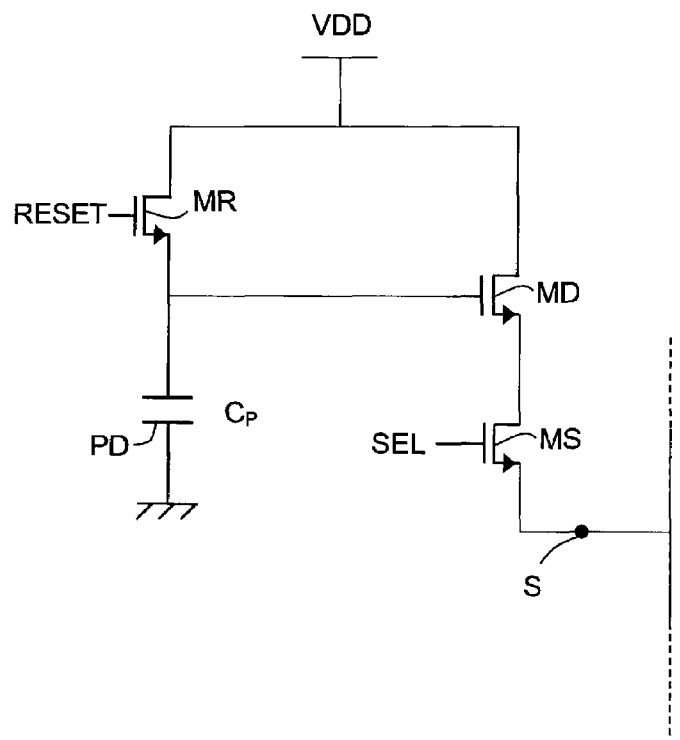
FIG. 1, which has already been described shows a classic prior art three-transistor CMOS active pixel.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Figure 2:
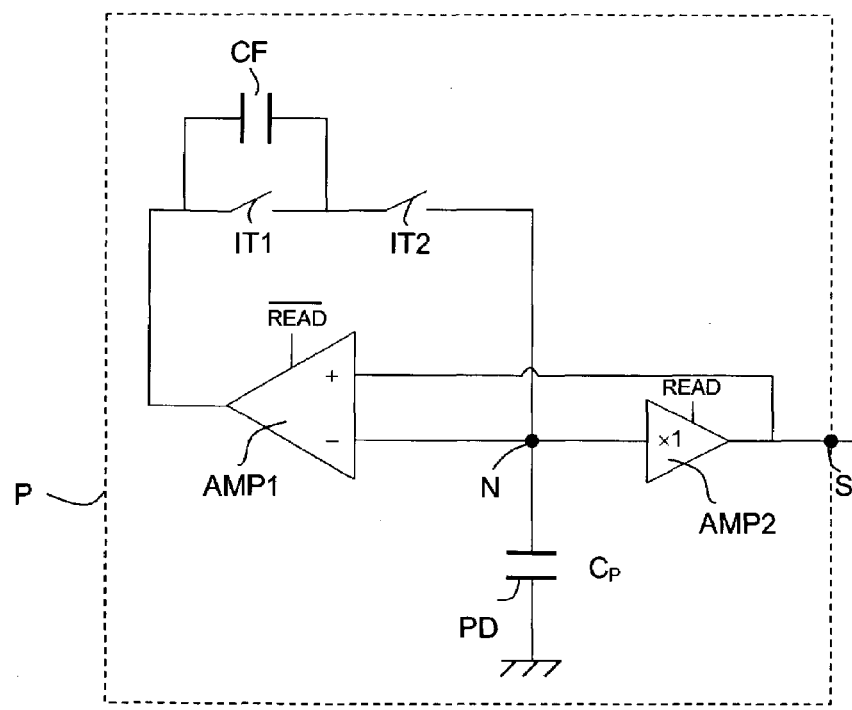
FIG. 2 is a drawing of another prior art CMOS active pixel.
Figure 5:
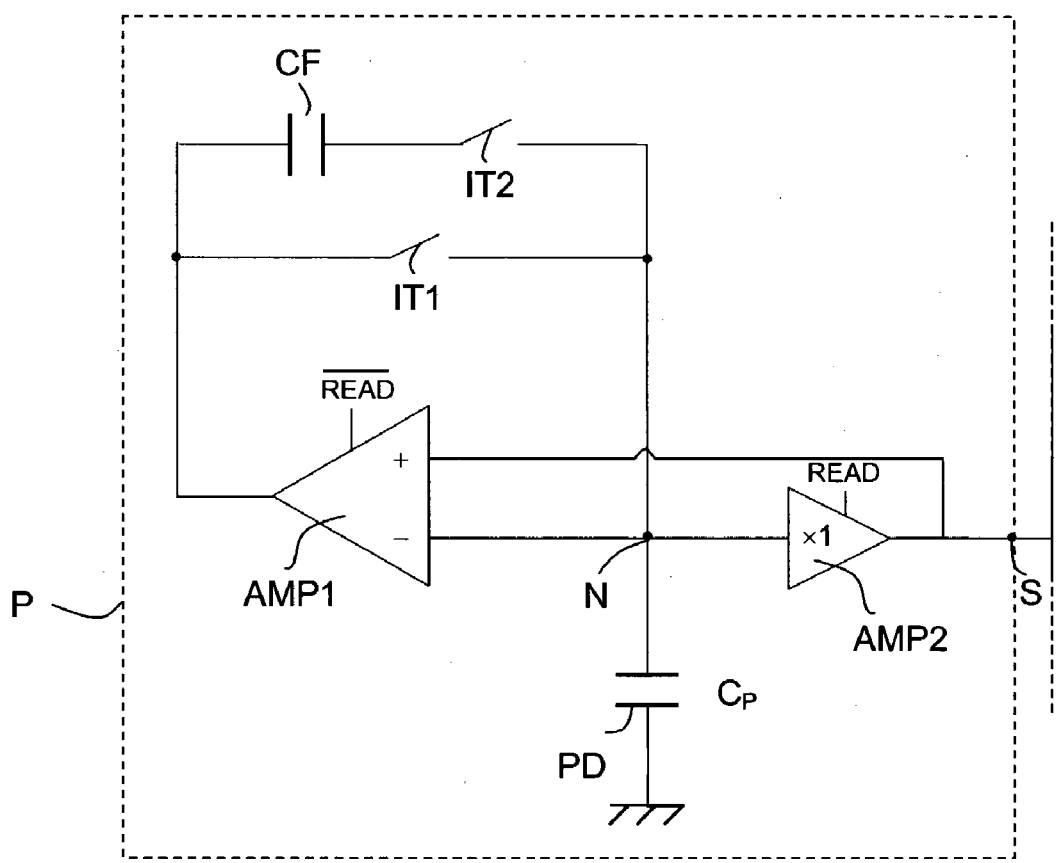
FIG. 5 is a drawing of a CMOS active pixel according to the invention.

The general structure of a CMOS active pixel according to the invention is shown in FIG. 5. The pixel structure is differentiated from the one shown in FIG. 2 in that the switch IT2 is series-connected with the capacitive element CF between the inverter input and the output of the amplifier AMP1, and in that the switch IT1 is connected between the inverter input and the output of the amplifier AMP1.

Figure 3:
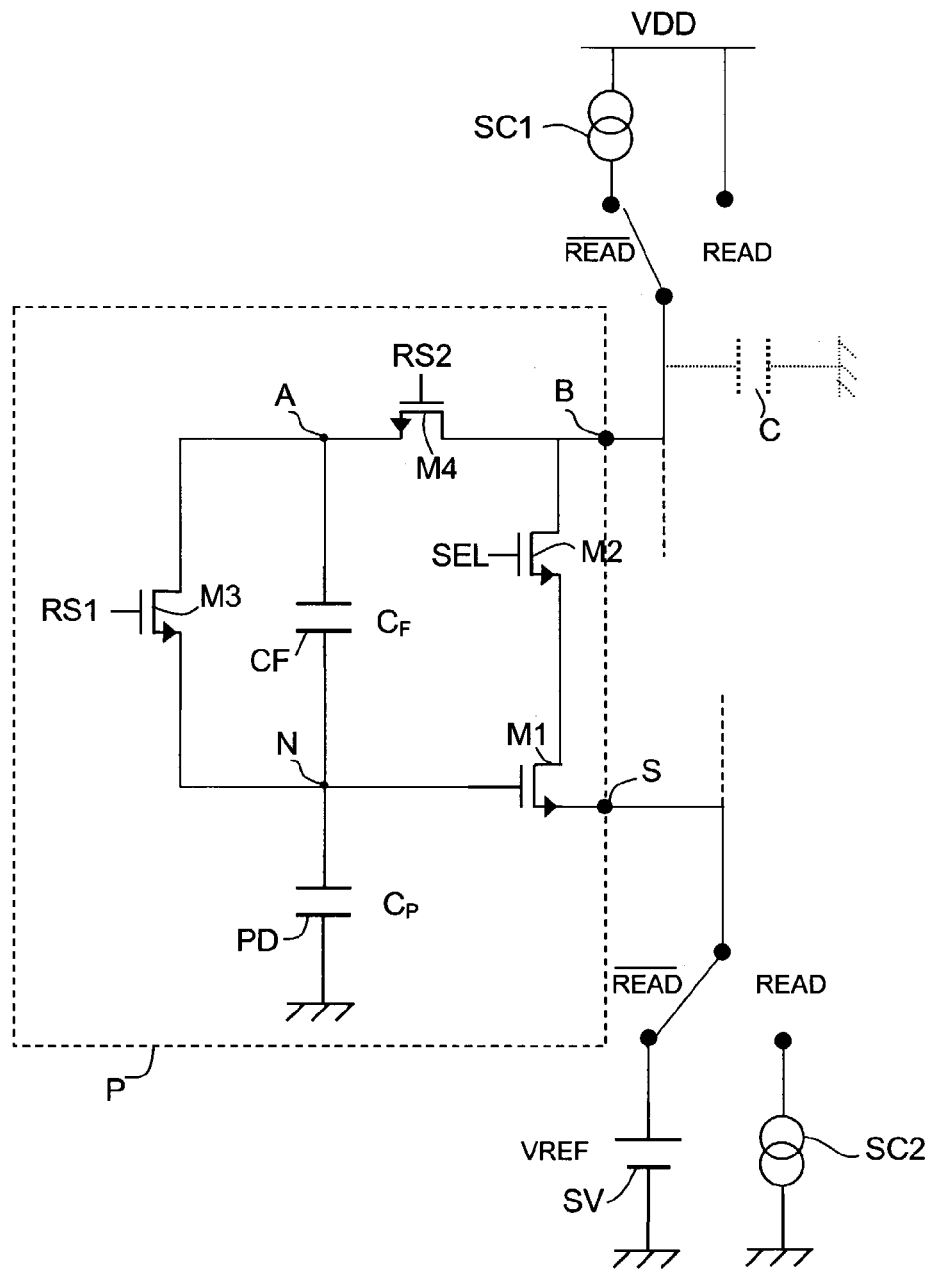
FIG. 3 is a more detailed drawing of the CMOS active pixel of FIG. 2.
Figure 6:
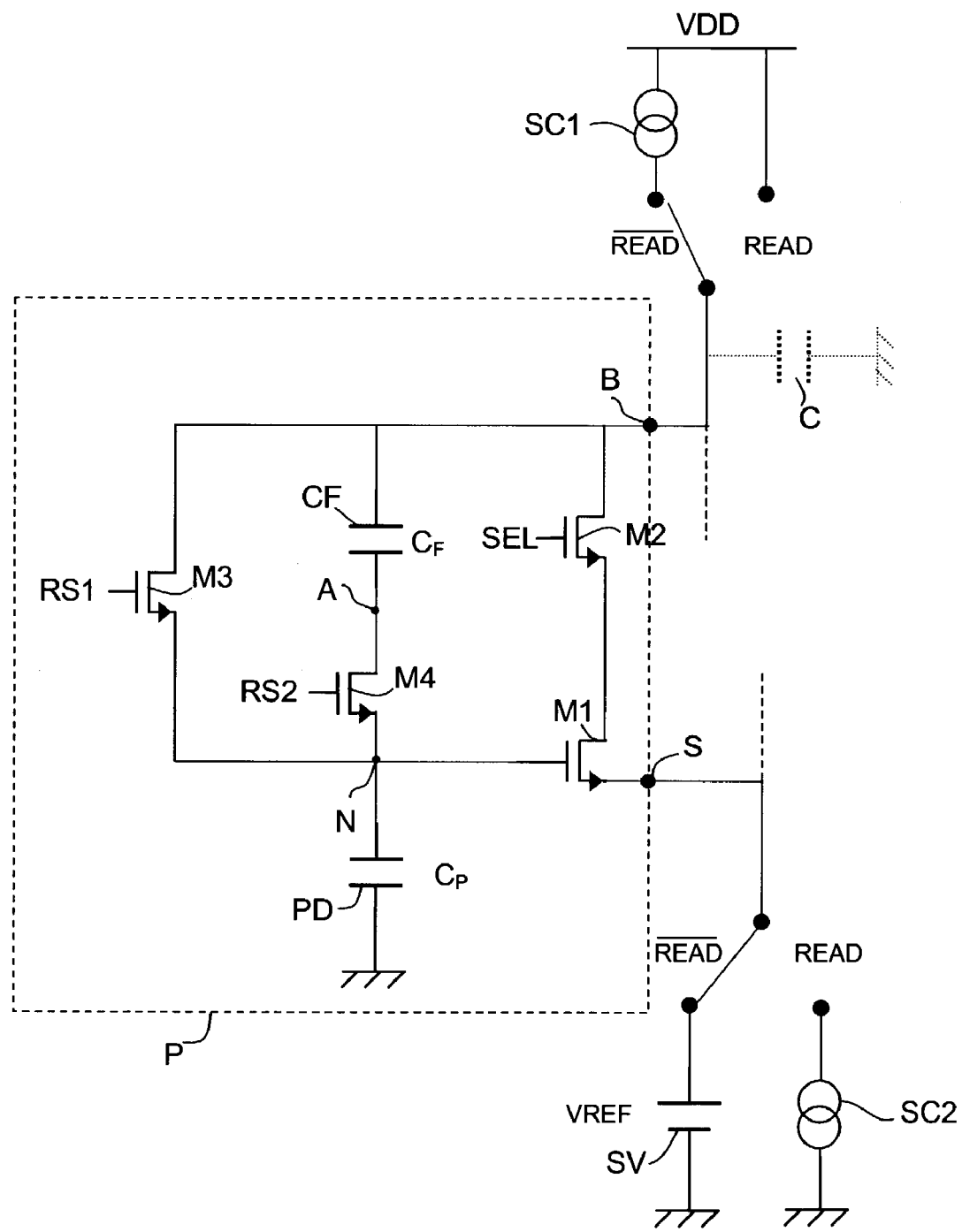
FIG. 6 is a more detailed drawing of the CMOS active pixel of FIG. 5.

A more detailed drawing of the pixel is shown in FIG. 6, to be compared with that of FIG. 3. The position of the capacitive element CF and of the transistors M3 and M4 forming the switches IT1 and IT2 is modified with respect to FIG. 3. According to the invention, the transistor M3 has its drain connected to the node B and its source connected to the photosensitive node N. Furthermore, the transistor M4 has its source connected to the photosensitive node N and its drain connected to the node A and the capacitive element CF is mounted between the node A and the node B. The remainder of the drawing is unchanged with respect to that of FIG. 3. Thus, all that has been said in the introduction to the present application on the structure of the CMOS active pixel applies to the present invention, except for the position of the transistors M3, M4 and of the capacitive element CF.

Figure 4:
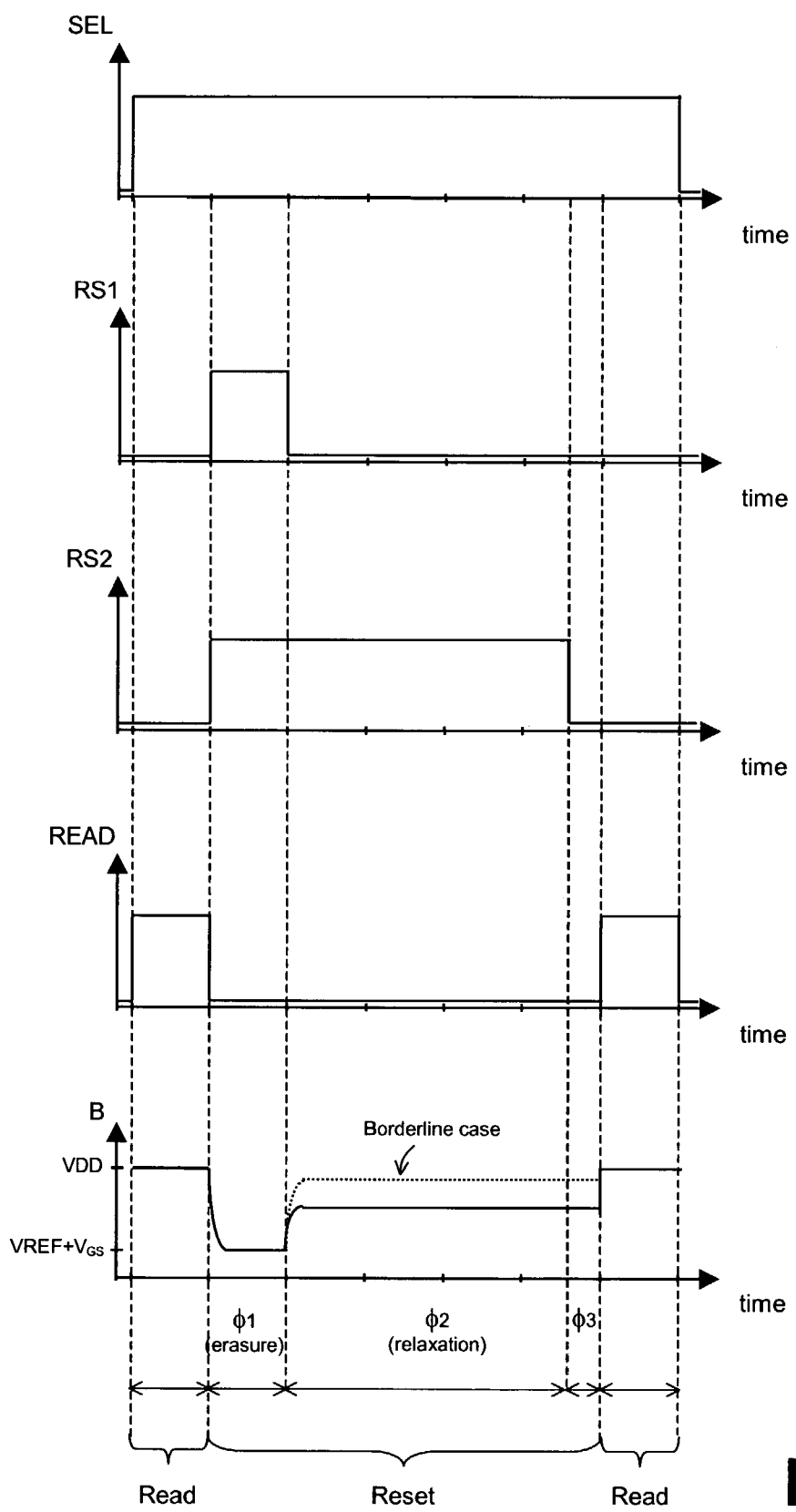
FIG. 4 shows the timing diagrams of the control signals for the CMOS active pixel according to FIG. 3.

With regard to the control signals SEL, RS1, RS2 and READ for the pixel, only the control signal RS2 applied to the gate of the transistor M4 is modified with respect to the timing diagrams of FIG. 4. This signal is active at the beginning of the erasure period $\phi_1$ to reset the potential at the capacitive element CF and during the greater part of the relaxation period $\phi_2$.

Figure 7:
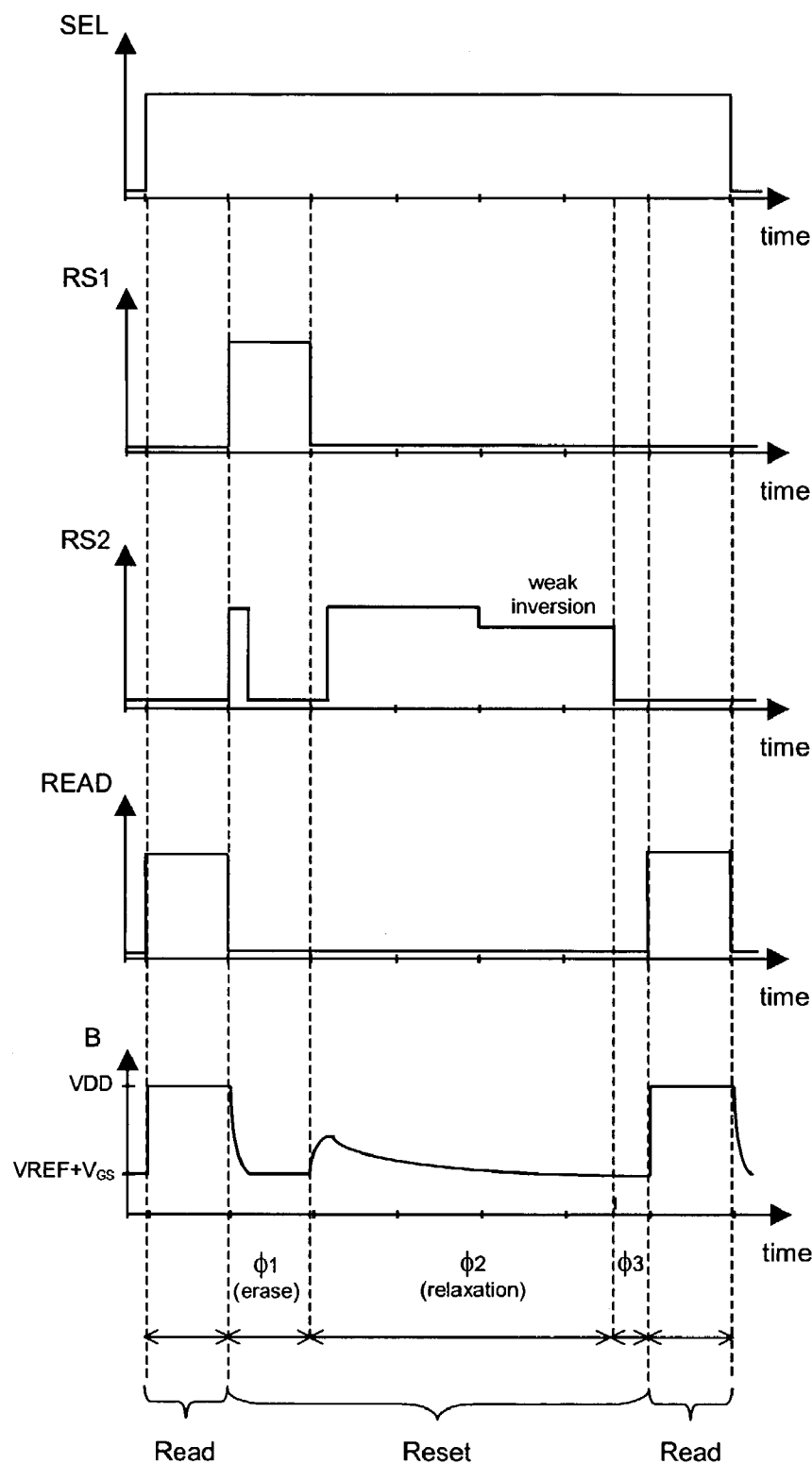
FIG. 7 shows the timing diagrams of the control signals and of the potential at the node B of the CMOS active pixel of FIG. 6.

The working of this CMOS active pixel is illustrated by the timing diagrams of the control signals SEL, RS1, RS2 and READ of FIG. 7. As described in the introduction to the present application, the method of reading the state of the pixel comprises two read phases separated by a reset phase. The first read phase is used for producing a signal representing the electrical charge of the photodiode after the illumination of the pixel by a light signal; the reset phase is used for resetting the electrical charge of the photodiode and the second read phase is used for producing a signal representing the initial electrical charge of the pixel. The difference between the two charges read gives the electrical charge due to the incident photons of the light signals.

During said first and second read phases, the control signal READ and the selection signal SEL are active while the signals RS1 and RS2 are inactive. The active pixel then works like the pixel of FIG. 3.

During the reset phase, the READ signal is inactive and the signal SEL remains active.

Erasure Period ($\phi_1$)

The signals RS1 and RS2 are active at the beginning of the phase $\phi_1$ to reset all the potentials of the pixel. Then rapidly, the signal RS2 again becomes inactive. The transistors M2 and M3 are conductive. The transistor M1 is mounted as an amplifier and the drain of the transistor M2 is connected to the gate of the transistor M1. A fixed potential VREF+$V_{GS}$(M1) is imposed on the photosensitive node N to erase the information contained in the photodiode.

Relaxation Period ($\phi_2$)

The relaxation period $\phi_2$ starts at the trailing edge of the control signal RS1. At the beginning of this period, the control signal RS2 remains inactive. There is therefore no feedback capacitance and the coupling capacitance of the transistor M3 associated with the trailing edge of the signal RS1 prompts a speedy rise in the potential at the node B. However, before the potential at the node B reaches its equilibrium value, a leading edge of the signal RS2 is made to occur. The result of this is:

the presence of a feedback capacitance CF necessary for this phase, the rise in the potential at the node B due to the trailing edge of the signal RS1 at the gate of the transistor M3 is compensated for by the leading edge of the signal RS2 applied to the gate of the transistor M4.

The first major condition for this compensation to be effective is that it is necessary to wait for the transistor M3 to be fully off in order to make the transistor M4 conductive. The transistor M4 then enables precise compensation for the electrical charges injected by the transistor M3 into the node common to the two transistors. This is why the command to close the transistor M4 does not take place immediately after the command to open the transistor M3 but some nanoseconds later.

The other condition is that the two transistors M3 and M4 must be matched so that the compensation is of the same amplitude as the voltage variation introduced by the capacitive coupling of the transistor M3 at the node B, but with an opposite sign. This means that the transistors M3 and M4 have the same dimensions, the same geometry and the same orientation in the integrated circuit forming said CMOS active pixel.

After the leading edge of the signal RS2, the potential at the node B returns to a level close to the one it has when the signal RS1 is active and the amplifier AMP1 can therefore work in its linear region during the relaxation period $\phi_2$.

Considering the reset noise, the transistor M3 is off during the relaxation period $\phi_2$. The noise voltage $$\sqrt{\frac{kT}{C_F}}$$

is sampled on the capacitive element CF. The transistor M1 is in a feedback loop with the capacitive divider formed by the capacitive element CF and the capacitance of the photodiode PD. The transistor M1 then works as an amplifier (amplifier AMP1). Since the transistors M1 and M2 are cascade-connected, a high static gain is then obtained for the amplifier.

The static gain of the transistor M1 is expressed in the following form:

$G_0 = gm_1 \times R_0$ where $gm_1$ is the transconductance of the transistor M1 and $R_0$ is its load impedance at the terminal B.

Since the ratio $C_F/C_P$ is far smaller than 1, the gain of the loop formed by the transistors M1 and M2 and the capacitive divider is far greater than 10 and is equal to:

$$G_b = G_0 \times \frac{C_F}{C_F + C_P} \gg 1$$

The value of the loop gain $G_b$ remains high despite the capacitive divider.

The gain-bandwidth product, equal to $gm_1/C$, where C represents the load capacitance on the terminal B, is fixed by the choice of the current flowing through the transistor M1, namely the current given by the current source SC1.

The relaxation period $\phi_2$ is maintained until the amplifier AMP1 reaches a new state of equilibrium. As a result of the high loop gain $G_b$, the reset noise $$\sqrt{\frac{kT}{C_F}}$$

sampled in feedback on the capacitive element is distributed as follows: a fraction $$\frac{1}{G_b + 1}$$

of this reset noise on the photodiode, and a fraction $$\frac{G_b}{G_b + 1}$$

of it on the drain of the transistor M2. The result thereof is that the noise, referenced B1, introduced by the capacitive element CF into the photodiode is highly attenuated by the loop gain. We then have:

$$B1 = \frac{\sqrt{\frac{kT}{C_F}}}{G_b + 1} \approx \frac{\sqrt{kT}}{G_0} \times \frac{C_F + C_P}{C_F^{3/2}}$$

A noise B2 corresponding to a very wide band is also produced by the transistor M4. This noise is not subjected to feedback by the amplifier because, beyond the gain-bandwidth product, the amplifier AMP1 no longer has any gain (<<1) and therefore no longer works as an amplifier. Its spectral density is attenuated by the capacitive divider formed by the capacitive element CF and the capacitance of the photodiode. We have:

$$B2 = \frac{C_F}{C_F + C_P} \times \sqrt{\frac{kT(C_F + C_P)}{C_F C_P}} = \sqrt{\frac{kT}{C_P}} \times \sqrt{\frac{C_F}{C_F + C_P}}$$

The usual noise produced by the photodiode $$\left(\sqrt{\frac{kT}{C_P}}\right)$$

therefore undergoes attenuation by the factor $$\sqrt{\frac{C_F}{C_F + C_P}} \ll 1.$$

According to an additional characteristic of the invention, it is planned to make the transistor M4 work in weak inversion before turning it off at the end of the period $\phi_2$ in order to further reduce the reset noise in the pixel. Indeed, the transistor M4 greatly contributes to the presence of this noise in the pixel. When a MOS transistor is used in weak inversion, it is shown that its spectral noise density is 3 dB less than what it would have been in the ohmic or linear region. To place the transistor M4 in weak inversion, it is enough to gradually reduce the control signal RS2 applied to its gate. When the state of weak inversion is reached, the transistor M4 can be completely turned off by a trailing edge of the signal RS2.

Third Period ($\phi_3$)

During the period $\phi_3$, the control signal RS2 is inactive and the transistor M4 is therefore off. This passage to a low level must be done in a very short period of time as compared with the time constant of the amplifier AMP1. The noise B2 is then blocked in the photodiode. The total noise in the photodiode is then the quadratic sum of B1 and B2 if the transistor M4 is in a state of strong inversion.

$$B_{total} = \sqrt{B1^2 + B2^2}$$

$$\text{that is } B_{total}^2 = kT\left[\frac{(C_P + C_F)^2}{G_0^2 C_F^3} + \frac{C_F}{C_P(C_F + C_P)}\right]$$

If, as planned, the transistor M4 is put into a state of weak inversion at the end of the relaxation period $\phi_2$, $B_{total}^2$ becomes equal to:

$$B_{total}^2 = kT\left[\frac{(C_P + C_F)^2}{G_0^2 C_F^3} + \frac{1}{2}\frac{C_F}{C_P(C_F + C_P)}\right]$$

Thus, when the value of the capacitance of the capacitive element CF increases, the noise B1 falls while the noise B2 rises. It is therefore possible to define a value $C_F$ for which the total noise is minimal. In practice, the minimum value of the total noise is far smaller than the value of the usual reset noise, namely $$\sqrt{\frac{kT}{C_P}}.$$

The performance of this pixel with respect to electrical charge injection, power supply rejection and the problem of lag is as follows:

Considering the injection of electrical charges into the photosensitive element, the trailing edge of the control signal RS1 (start of $\phi_2$) prompts an injection of charges into the photodiode coming from the transistor M3. This injection is then corrected by the leading edge of the signal RS2 during the relaxation period $\phi_2$. The result thereof is that the photosensitive node is protected against a major injection of electrical charges.

Considering the power supply voltage rejection, the power supply noise is filtered by the capacitance C present at the node B and then attenuated by the capacitive divider before reaching the photosensitive node. For the noise injected by the selection signal SEL, this signal may be filtered since its transitions may be slow. The drain of the transistor M1 is then uncoupled from the supply and the photodiode too.

Considering the lag mechanism, when the transistors M1, M2 and M3 are conductive during the erasure period $\phi_2$, a fixed voltage is imposed at low impedance on the photodiode. This fixed voltage is independent of the initial value contained in the pixel. The value of the time constant needed to reach this state is small: it is about 50 ns. The result of this is that, at the end of a period corresponding to the time constant multiplied a few times, the initial value of the pixel is totally erased.

The reset method described here above may be applied to any CMOS active pixel comprising at least one photosensitive element with a capacitance $C_P$ having a photosensitive node N, an amplifier AMP1 having an inverter input connected to said photosensitive node, a non-inverter input and an output, a first switch IT1 initially in an open state connected between the inverter input and the output of said amplifier, a capacitive element CF having a capacitance $C_F$ connected between the output of said amplifier and an intermediate node A of the pixel, and a second switch IT2 initially in an open state connected between the photosensitive node N and the intermediate node A. Very generally, the method then comprises the following steps:

during a first period $\phi_1$, applying a reference voltage VREF+$V_{GS}$(M1) to the non-inverter input of said amplifier AMP1, connecting the output of said amplifier to its inverter input in closing said first switch IT1 during the period $\phi_1$, and briefly applying the reference voltage VREF+$V_{GS}$(M1) to the two terminals of the capacitive element in momentarily closing the second switch IT2 at the beginning of said period $\phi_1$ to reset the load of this switch IT2, during a second period, called a relaxation period $\phi_2$, setting up a feedback loop between the output of said amplifier AMP1 and its inverter input by means of said feedback capacitive element CF in closing said second switch IT2 until a state of equilibrium is reached, said first switch IT1 being open; and during a third period $\phi 43$, opening the second switch IT2.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A CMOS active pixel for an image sensor comprising:
   a photosensitive element whose electrical charge is reset during a reset phase and read during a read phase, the photosensitive element connected between a photosensitive node and a ground;
   a first amplifier, active during the reset phase, the first amplifier including an output, an inverter input connected to the photosensitive node, and a non-inverter input connected to a reference voltage source;
   a first switch, connected between the inverter input and the output of the first amplifier, the first switch controlled by a first control signal that is active during a first period of the reset phase and inactive during a second period and a third period of the reset phase and during a read phase;
   a capacitive element connected between the output of the first amplifier and an intermediate node of the pixel;
   a second switch connected between the photosensitive node and the intermediate node of the pixel, controlled by a second control signal that is active during the start of the first period of the reset phase and during the totality of the second period of the reset phase and inactive during the third period of the reset phase and during the read phase, and
   a second amplifier mounted as a follower, active during the read phase, the second amplifier including an input connected to the photosensitive node and an output delivering a signal representing the electric charge of the photosensitive element during the read phase.

2. The CMOS active pixel according to claim 1, wherein the first amplifier and the second amplifiers further comprise:
   a first transistor with a gate is connected to the photosensitive node and a source connected to the reference voltage source during the reset phase and to a first current source during the read phase; and
   a selection transistor controlled by a selection signal active during the reset and read phases of the pixel, the selection transistor with a source connected to the drain of the first transistor and a drain connected to a second current source during the reset phase and to a power voltage source during the read phase, the source of the first transistor delivering the signal representing the electrical charge of the photosensitive element during the read phase.

3. The CMOS active pixel according to claim 2, wherein $C_p$ represents the capacitance of the photosensitive element and $C_F$ represents the capacitance of the capacitive element, so that the ratio $C_F/C_p$ is less than 1 and wherein the gain of the first amplifier is such that the product of this gain by the ratio $C_F/(C_F+C_p)$ is greater than 10.

4. A CMOS active pixel according to claim 3, wherein the first switch and the second switch are formed by MOS transistors with similar dimensions and geometry.

5. A CMOS active pixel according to claim 2, wherein the first switch and the second switch are formed by MOS transistors with similar dimensions and geometry.

6. The CMOS active pixel according to claim 1, wherein $C_p$ represents the capacitance of the photosensitive element and $C_F$ represents the capacitance of the capacitive element, so that the ratio $C_F/C_p$ is less than 1 and wherein the gain of the first amplifier is such that the product of this gain by the ratio $C_F/(C_F+C_p)$ is greater than 10.

7. A CMOS active pixel according to claim 6, wherein the first switch and the second switch are formed by MOS transistors with similar dimensions and geometry.

8. A CMOS active pixel according to claim 1, wherein the first switch and the second switch are formed by MOS transistors with similar dimensions and geometry.

9. A method for resetting a CMOS active pixel comprising at least one photosensitive element with a capacitance having a photosensitive node, an amplifier with an inverter input connected to the photosensitive node, a non-inverter input and an output, a first switch initially in an open state connected between the inverter input and the output of the amplifier, a capacitive element with a capacitance connected between the output of the amplifier and an intermediate node of the pixel, and a second switch initially in an open state connected between the photosensitive node and the intermediate node of the pixel, the method comprising:
   during a first period
      applying a reference voltage to the non-inverter input of the amplifier;
      connecting the output of the amplifier with an non-inverter input of the amplifier by closing the first switch during the first period; and briefly applying the reference voltage to the two terminals of the capacitive element by momentarily closing the second switch at the beginning of the first period to reset the charge of this switch;

during a second period setting up a feedback loop between the output of the amplifier and the inverter input by means of the feedback capacitive element by closing the second switch until a state of equilibrium is reached, the first switch being open; and during a third period opening the second switch.

10. The method according to claim 9, wherein $C_P$ represents the capacitance of the photosensitive element and $C_F$ represents the capacitance of the capacitive element, so that the ratio $C_F/C_p$ is less than 1 and wherein the gain of the amplifier is such that the product of this gain by the ratio $C_F/(C_F+C_p)$ is greater than 10.

11. The method according to claim 10, wherein at the beginning of the second period, the second switch is brought into a closed state when the first switch is in a completely open state.

12. The method according to claim 11, wherein the first switch and the second switch are formed by MOS transistors with similar dimensions and geometry.

13. The method according to claim 12, wherein at the end of the second period, the transistor forming the second switch is placed in a state of weak inversion just before it is turned off.

14. The method according to claim 10, wherein the first switch and the second switch are formed by MOS transistors with similar dimensions and geometry.

15. The method according to claim 14, wherein at the end of the second period, the transistor forming the second switch is placed in a state of weak inversion just before it is turned off.

16. The method according to claim 9, wherein at the beginning of the second period, the second switch is brought into a closed state when the first switch is in a completely open state.

17. The method according to claim 16, wherein the first switch and the second switch are formed by MOS transistors with similar dimensions and geometry.

18. The method according to claim 17, wherein at the end of the second period, the transistor forming the second switch is placed in a state of weak inversion just before it is turned off.

19. The method according to claim 9, wherein the first switch and the second switch are formed by MOS transistors with similar dimensions and geometry.

20. The method according to claim 19, wherein at the end of the second period, the transistor forming the second switch is placed in a state of weak inversion just before it is turned off.

* * * * *